United States Patent [19]

Koyama

[11] Patent Number: 4,953,124
[45] Date of Patent: Aug. 28, 1990

[54] OPTO-MAGNETIC SIGNAL REPRODUCING APPARATUS FOR READING, BY DIFFERENTIAL DETECTION USING A MAGNETO-OPTICAL EFFECT, INFORMATION MAGNETICALLY RECORDED ON A RECORD MEDIUM

[75] Inventor: Osamu Koyama, Kawasaki, Japan

[73] Assignee: Canon Kabushiki Kaisha, Tokyo, Japan

[21] Appl. No.: 94,300

[22] Filed: Sep. 8, 1987

[30] Foreign Application Priority Data

Sep. 12, 1986 [JP] Japan ............................... 61-215089

[51] Int. Cl.$^5$ .......................... G11B 11/00; G11B 7/00
[52] U.S. Cl. .................................... 365/122; 365/128; 365/124; 365/121; 369/13; 369/110; 360/114; 350/3.82
[58] Field of Search ................... 360/114; 369/13, 110; 365/122, 121, 124, 128; 350/407, 3.82, 642; 356/358, 350, 355

[56] References Cited

U.S. PATENT DOCUMENTS

| | | | |
|---|---|---|---|
| 4,558,440 | 12/1985 | Tomita | 369/13 X |
| 4,561,032 | 12/1985 | Matsumoto et al. | 360/114 X |
| 4,569,035 | 2/1986 | Tomita | 365/122 X |
| 4,573,149 | 2/1986 | Deguchi et al. | 360/114 |
| 4,599,714 | 7/1986 | Endo | 360/114 |
| 4,672,593 | 6/1987 | Ojima et al. | 365/122 |
| 4,682,311 | 7/1987 | Matsubayashi et al. | 369/13 X |
| 4,691,308 | 9/1987 | Takagi et al. | 365/122 |
| 4,725,725 | 2/1988 | Andó | 369/110 |
| 4,729,122 | 3/1988 | Itoh | 369/13 X |

FOREIGN PATENT DOCUMENTS

| | | | |
|---|---|---|---|
| 57-176550 | 10/1982 | Japan . | |
| 59-54054 | 3/1984 | Japan | 369/13 |
| 60-095744 | 5/1985 | Japan . | |
| 60-151855 | 8/1985 | Japan . | |

*Primary Examiner*—Stuart N. Hecker
*Assistant Examiner*—Alfonso Garcia
*Attorney, Agent, or Firm*—Fitzpatrick, Cella, Harper & Scinto

[57] ABSTRACT

An opto-magnetic signal reproducing apparatus includes a light source unit for applying a linearly polarized light beam to a recording medium having magnetically recorded information, a splitter for splitting the light beam modulated, responding to the recorded information by a magneto-optic effect, into two light beams having different polarization directions from each other, and a reproducing device for differentially detecting the split light beams to reproduce the recorded information. The splitter imparts a phase different equal to an integer multiple of $\pi$ to each of the split light beams.

6 Claims, 5 Drawing Sheets

OPTO-MAGNETIC SIGNAL REPRODUCING APPARATUS FOR READING, BY DIFFERENTIAL DETECTION USING A MAGNETO-OPTICAL EFFECT, INFORMATION MAGNETICALLY RECORDED ON A RECORD MEDIUM

BACKGROUND OF THE INVENTION

1. Field of the Invention

The present invention relates to an opto-magnetic signal reproducing apparatus for reading, by a magneto-optical effect, information recorded on an opto-magnetic recording medium.

2. Related Background Art

An opto-magnetic signal reproducing apparatus magnetically records information by utilizing local temperature rise of a magnetic film by spot irradiation of a laser beam and reproduces the information by magneto-optical effect. The apparatus has a large capacity memory which is erasable and rewritable.

Figure 1:
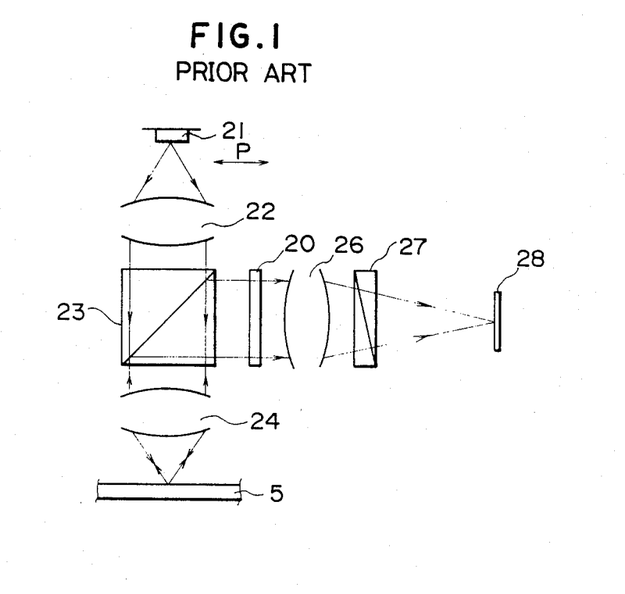
FIG. 1 shows a prior art opto-magnetic signal reproducing apparatus.

FIG. 1 shows an example of a conventional opto-magnetic signal reproducing apparatus and illustrates the configuration and principles of signal reproduction. In FIG. 1, numeral 21 denotes a semiconductor laser, numeral 22 denotes a collimator lens, numeral 23 denotes a polarization beam splitter, numeral 24 denotes an objective lens, numeral 5 denotes an opto-magnetic recording medium, numeral 26 denotes a focusing lens, numeral 27 denotes an analyzer, numeral 28 denotes a photo-detector and numeral 20 denotes a phase shifter. Assuming that a P polarization plane is in a direction P and a direction of polarization of the semiconductor laser 21 is in the P polarization direction, a light beam emitted from the semiconductor laser 21 is collimated by the collimator lens 22 and directed to the polarization beam splitter 23. A high C/N signal is produced when $t_p^2 \sim 70\%$ and $R_s^2 \sim 100\%$ where $t_p$ is an amplitude transmission rate of a P polarization component for the polarization beam splitter 23 and $r_s$ is an amplitude reflection rate of an S polarization component. The collimated light beam passed through the polarization beam splitter 23 is focused by the objective lens 24 on the opto-magnetic recording medium 5 as a fine spot.

Figure 2:
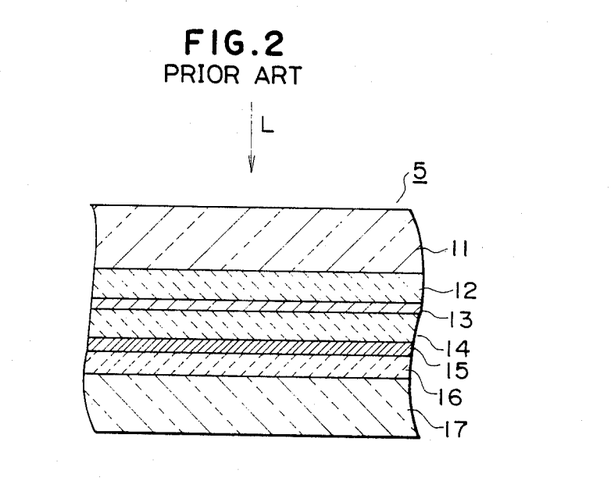
FIG. 2 shows a sectional view of a general structure of an opto-magnetic recording medium.

The opto-magnetic recording medium 5 is constructed as shown in sectional view FIG. 2, in which numerals 11 and 17 denote transparent substrates, numerals 12 and 14 denote dielectric multi-layer films, numeral 13 denotes a magnetic film, numeral 15 denotes a metal reflection film and numeral 16 denotes a protective film.

The light beam is directed in a direction shown by arrow L and has a polarization plane thereof rotated oppositely in accordance with a direction of magnetization (magnetic domain) of a spot irradiated area (magneto-optic Kerr effect), and a Kerr rotation angle is amplified by the dielectric multi-layer films 12 and 14 and the metal reflection film 15. A tracking guide groove is usually formed in the transparent substrate 11, although it is omitted in FIG. 2.

The light reflected by the opto-magnetic recording medium 5 is collimated by the objective lens 24 of FIG. 1 and reflected by the polarization beam splitter 23. Thus, an apparent Kerr rotation angle is increased by a ratio of $r_p^2$; (wherein $r_p^2 = 1 - t_p^2$) and $r_s^2$. Then, the light is separated into a polarization component by the analyzer 27 through the focusing lens 26, and is directed to the photo-detector 28 as a signal light.

Figure 3:
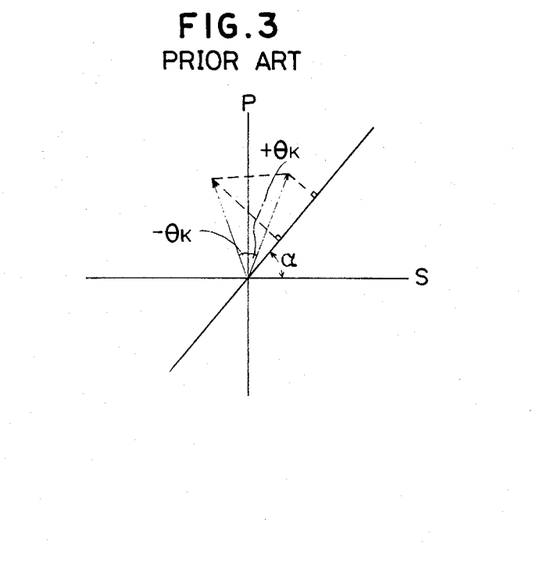
FIG. 3 illustrates a principle of detection of an opto-magnetic signal by the apparatus shown in FIG. 1.

The reflected light directed to the analyzer has the polarization plane thereof rotated by $\pm \theta k$ shown in FIG. 3 in accordance with the magnetic domain on the medium. Accordingly, if a transmission axis direction is an angle $\alpha$ with respect to the S polarization direction, a light intensity detected by the photo-sensor 28 is the square of the normal projection component of the amplitude to the analyzer transmission axis, and a signal intensity-modified in accordance with the magnetic domain is read out. The signal light I is represented by $$I \propto R^2 = (\sin^2 \alpha + \theta k \sin 2\alpha) \ldots \quad (1)$$

where R is a Fresnel reflection factor of the opto-magnetic medium. A second term of the formula (1) represents the opto-magnetic signal.

There is usually a phase difference between the P polarization beam and the S polarization beam reflected by the opto-magnetic recording medium. Thus, strictly speaking, a linear polarization beam shown in FIG. 3 is not produced, but an elliptic polarization beam is produced. When an ellipse rate is high, a C/N ratio (an S/N ratio in a carrier wave band) of a reproduced signal may be lowered. To prevent it, Japanese patent application Laid Open No. 20342/1985 proposed to insert a phase shifter as shown in FIG. 1 to reduce the phase difference.

On the other hand, in another approach to improve the C/N ratio of the reproduced signal, the reflection light from the opto-magnetic recording medium is split by a half-mirror and the split light beams are differentially detected through analyzers having different transmission axis directions. Thus, the signal light I' is represented by $$I' \propto R^2 \theta_K \sin 2\alpha \ldots \quad (2)$$

and the first term of the formula (1) is eliminated and a high C/N ratio signal is produced. Such a differential detection is disclosed in U.S. Pat. No. 4,558,440 issued on Dec. 10, 1985, FIGS. 8A and 8B and specification column 9, line 29 through column 10, line 25, U.S. Pat. No. 4,561,032 issued on Dec. 24, 1985, FIGS. 8A and 8B and specification column 9, line 26 through column 10, line 23; U.S. Pat. No. 4,569,035 issued on Feb. 4, 1986, FIGS. 7A and 7B and specification column 5, lines 9 through 24; and U.S. Pat. No. 4,599,714 issued on Jul. 8, 1986, FIG. 1 and specification column 1, lines 23 through 51.

However, the half-mirror for splitting the light beam usually has a property to cause a phase difference between the P polarization component and the S polarization component of each of the transmitted light and the reflected light. Accordingly, in the differential detection, even if the phase difference between the P and S polarization components by the recording medium is compensated by the phase shifter described in the above Japanese patent application, a phase difference is caused by the half mirrors between the P and S polarization components of each of the two split light beams and a difference results between opto-magnetic signal levels. As a result, the C/N ratio is lowered.

SUMMARY OF THE INVENTION

It is an object of the present invention to provide an opto-magnetic signal reproducing apparatus which can overcome the reduction of the C/N ratio due to a phase difference between the P and S polarization components of each of the detected lights when an opto-magnetic signals are differentially detected.

The above object of the present invention is achieved by an opto-magnetic signal reproducing apparatus which irradiates a light beam polarized in a predetermined direction to a recording medium having magnetic information recorded thereon, splits a light beam modulated by a magneto-optic effect by a light splitting device and reproduces the information by differentially detecting the split light beams, characterized by imparting a phase difference equal to an integer multiple of $\pi$ to each of the light beams to be differentially detected.

DETAILED DESCRIPTION OF THE PREFERRED EMBODIMENTS

Figure 4:
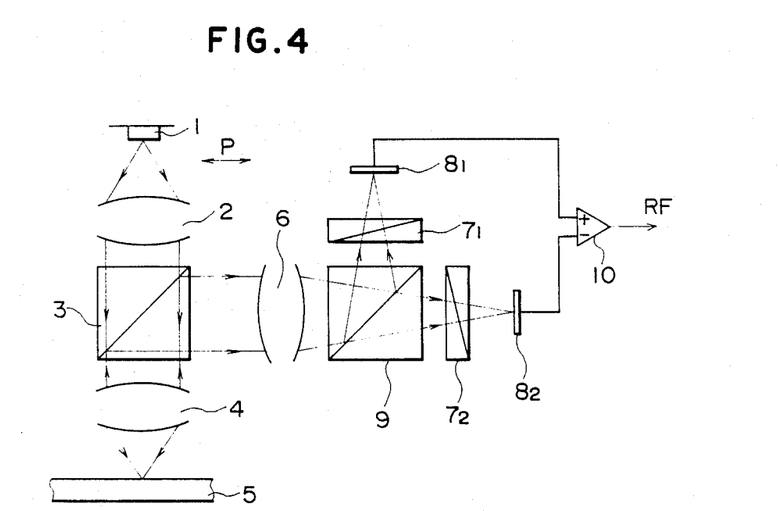
FIG. 4 shows one embodiment of an opto-magnetic signal reproducing apparatus of the present invention.

FIG. 4 shows one embodiment of the opto-magnetic signal reproducing apparatus of the present invention. Numeral 1 dentoes a semiconductor laser, numeral 2 denotes a collimator lens, numeral 3 denotes a polarization beam splitter, numeral 4 denotes an objective lens, numeral 5 denotes an opto-magnetic recording medium, numeral 6 denotes a focusing lens, numerals $7_1$ and $7_2$ denote analyzers, numerals $8_1$ and $8_2$ denote photodetectors and numeral 9 denotes a half-mirror.

Transmission axes of the analyzers $7_1$ and $7_2$ make an angle of 90° therebetween, outputs of the photo-detectors $8_1$ and $8_2$ are differentiated by a differential amplifier 10 and a reproduced signal RF is obtained based on a well-known differential detection principle. It is the polarization beam splitter 3 (phase difference $\delta_{PBS}$), multi-layer film (phase difference $\delta_M$) and transparent substrate (phase difference $\delta_S$) made of magnetic material, dielectric material or metal in the opto-magnetic medium 5 which impart the phase difference between P and S polarization beams.

Figure 5:
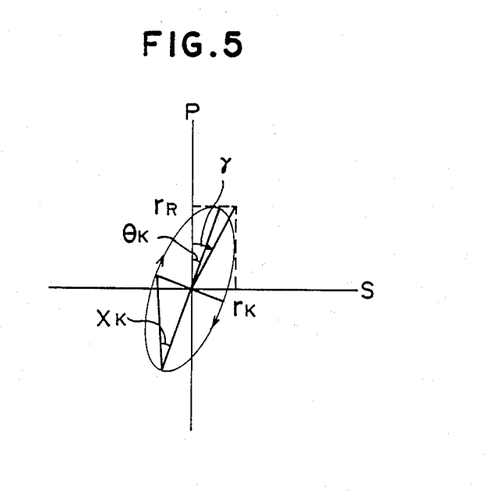
FIG. 5 illustrates polarization of a light beam reflected by the recording medium.

The P polarization light beam irradiated to the opto-magnetic recording medium 5 from the semiconductor laser 1 is imparted with the phase difference $\delta_M$ and reflected as an elliptic polarization beam shown in FIG. 5. A Fresnel component $r_R$ (P polarization direction) of an amplitude reflection factor, a Kerr component $r_K$ (S polarization direction), a Kerr rotation angle $\theta_K$ and a Kerr ellipse factor $x_K$ of the opto-magnetic recording medium 5 have a relationship of:

$$\frac{r_K}{r_R} = \theta_K + i x_K \quad (3)$$

Or, $r_K$ and $r_R$ may be expressed by amplitudes and phases A and B as follows.

$$\left. \begin{array}{l} r_K = |r_K| e^{iA} \\ r_R = |r_R| e^{iB} \end{array} \right\} \quad (4)$$

If $\delta_M = A - B$, then $$\frac{r_K}{r_R} = \frac{|r_K|}{|r_R|} e^{i(A-B)} = \frac{|r_K|}{|r_R|} e^{i\delta_M} \quad (5)$$

The parameters in FIG. 5 are connected by the following formulas.

$$\left. \begin{array}{l} \theta_K = \frac{|r_K|}{|r_R|} \cos \delta_M \\ x_K = \frac{|r_K|}{|r_R|} \sin \delta_M \\ \tan \gamma = \frac{|r_K|}{|r_R|} \end{array} \right\} \quad (6)$$

From the formulas (6), the level of the opto-magnetic signal light in the formulas (1) and (2) is given by $$I \propto R^2 \theta_K \sin 2\alpha \cos \delta_M = I_O \cos \delta_M \ldots \quad (7)$$

From the formula (7), if the phase difference $\delta_M = 60°$ the level of the opto-magnetic signal light is reduced to one half, and when $\delta_M = 90°$, it cannot be detected.

Figure 6:
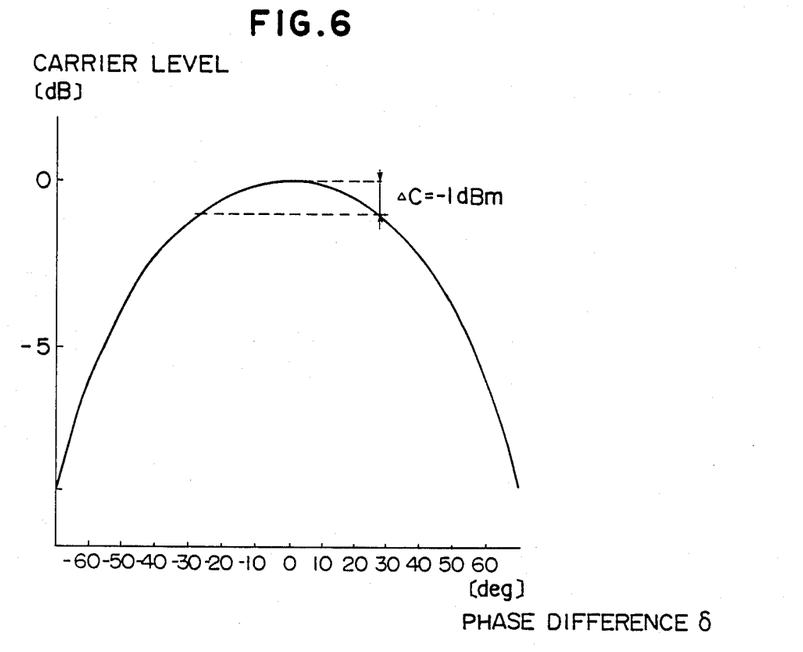
FIG. 6 shows a relationship between a phase difference of the P and S polarization components of the detected light beams and a carrier level of the opto-magnetic signal.

When the opto-magnetic signal level is observed by the C/N ratio by a spectrum analyzer, a carrier level C is given by $$C \propto 10 \log I^2 = 20 \log (I_O \cos \delta) \ldots \quad (8)$$

and the phase difference and the carrier level have a relation shown in FIG. 6. For example, when $\delta_M = 60°$, the carrier level is lowered by 6 dB.

In the present embodiment, the phase difference $\delta_M$ is phase-compensated by the phase difference $\delta_S$ imparted by the substrate and the phase difference $\delta_{PBS}$ imparted by the polarization beam splitter 3. Namely, $$\delta_M + \delta_S + \delta_{PBS} \sim n\pi (n=0, \pm 1, \pm 2, \ldots) \ldots \quad (9)$$

If there are n optical elements (including the polarization beam splitter) which imparts phase differences, a total phase difference $\delta_Q$ imparted by the optical system is given by $$\delta_Q = \sum_{i=1}^{n} \delta_i \, (i = 1, 2, \ldots n) \quad (10)$$

The formula (9) is generally expressed by $$\delta_M + \delta_S + \delta_Q \sim n\pi (n=0, \pm 1, \pm 2, \ldots) \ldots \quad (11)$$

If a permissible phase difference converted to the reduction of the carrier level C is 1 dB, $$\left(-\frac{1}{6} + n\right)\pi < \delta_M + \delta_S + \delta_Q < \left(\frac{1}{6} + n\right)\pi \quad (12)$$

$(n = 0, \pm 1, \pm 2, \ldots)$

From many experiments, it has been proven that there is no practical problem if the phase difference is within the range of the formula (12).

In the present embodiment, a phase difference $\delta_{HM}$ imparted by the half-mirror 9 which constitutes a light splitting means for differential detection is given by $$\delta_{HM} \sim n\pi (n=0, \pm 1, \pm 2, \ldots) \ldots \quad (13)$$

The half-mirror usually imparts the phase difference $\delta_{HM}$ only in the reflected light (and $\delta_{HM} \sim 0$ in the transmitted light) and a phase difference is created the differentially detected light beams. As a result, a difference between the opto-magnetic signal levels is created and a correct signal is not detected. By using the half-mirror which meets formula (13), the affect of the phase difference in the differential detection is eliminated and a high C/N ratio opto-magnetic signal is reproduced.

Figure 7A:
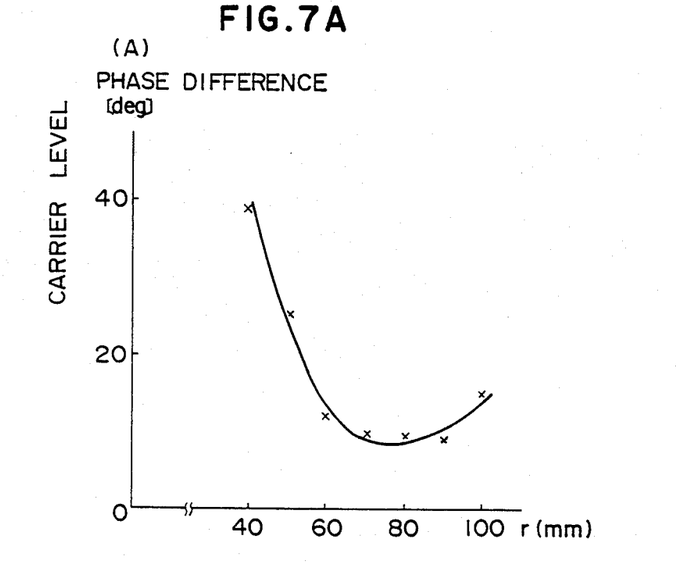
FIGS. 7A and 7B show distributions of phase difference in a substrate of the second medium.
Figure 7B:
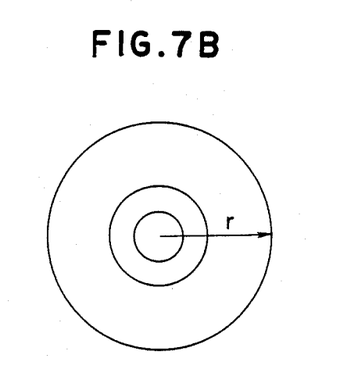

A specific example is explained below. A four-element amorphous magnetic film of GdTbFeCo was formed on a polycarbonate substrate as a recording layer to form an opto-magnetic recording layer of a structure shown in FIG. 2. It had a Kerr rotation angle $\theta_K$ of 0.7°, and a phase difference $\delta_M$ by the medium of +130°. At a distance r from a center of the polycarbonate substrate shown in a plan view of FIG. 7B, the phase difference imparted to the reproduced light by birefraction distributed is shown in FIG. 7A. A mean value of the phase difference $\delta_S$ by the substrate was approximately ±20° and ranged between +10° to approximately +40°. The polarization beam splitter 3 was designed such that it had the P polarization transmission factor $t_P{}^2$ of 70%, S polarization reflection factor $r_S{}^2$ of 98% and the reflected phase difference $\delta_{PBS}$ of +30°, and the phase differences $\delta_M$ and $\delta_S$ created by the multilayer film and the transparent substrate of the opto-magnetic medium cancel each other. Thus, the phase difference $\delta'$ to the half-mirror was given by $$\delta' = \delta_M + \delta_S + \delta_{PBS} \sim 180° \, {}^{+20°}_{-10°} \quad (14)$$

The half-mirror 9 was designed such that it had the P polarization transmission factor $t_P{}^2$ of 50%, S polarization transmission factor $t_S{}^2$ of 50% and the reflected light phase difference $\delta_{HM}$ of 180° and there was no substantial reduction of the opto-magnetic signal level. The phase differences $\delta$ imparted by the system to the respective differentially detected lights are:

$$\left. \begin{array}{l} \delta(\text{reflected light}) = \delta_M + \delta_S + \delta_{PBS} + \delta_{HM} \sim 360° \, {}^{+20°}_{-10°} \\ \delta(\text{transmitted light}) = \delta_M + \delta_S + \delta_{PBS} \sim 180° \, {}^{+20°}_{-10°} \end{array} \right\} \quad (15)$$

Thus, the phase difference is within the range of the formula (12) even in the differential detection. The reduction of the opto-magnetic signal level by the phase difference is in the order of 0.5 dB when converted to a carrier level and it does not pose a practical problem and a high C/N ratio opto-magnetic signal was reproduced.

Figure 8:
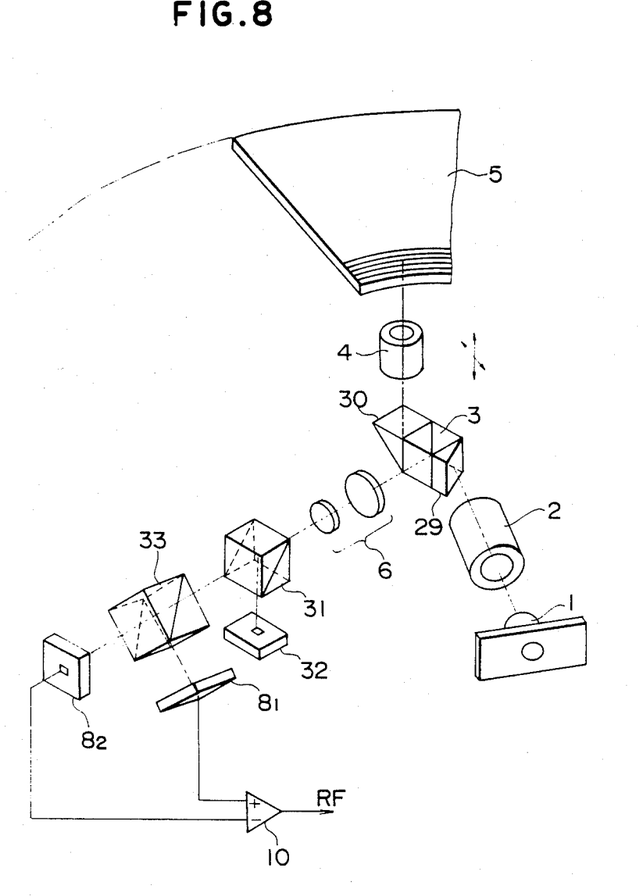
FIG. 8 shows another embodiment of the present invention.

FIG. 8 shows a perspective view of another embodiment of the present invention. Like elements to those shown in FIG. 4 are designated by like numerals and detailed explanation thereof is omitted.

In the present embodiment, the half-mirror 9 and the analyzers $7_1$ and $7_2$ of the embodiment of FIG. 4 are replaced by a second polarization beam splitter 33, which splits the light beam from the medium 5 into two light beams having orthogonal polarization directions and directs them to the photo-detectors $8_1$ and $8_2$. The polarization beam splitter 33 has a P polarization transmission factor $t_P$ of 100% and S polarization transmission factor $t_S$ of 0% (S polarization reflection factor $r_S$ of 100%). Accordingly, as in the embodiment of FIG. 4, the output of the photo-detectors $8_1$ and $8_2$ are differentiated by the differential amplifiers 10 to produce the reproduced signal RF. The polarization beam splitter 33 is designed to impart a phase difference of an integer multiple of $\pi$ to each of the split light beams. In the present embodiment, the phase difference between the split light beams does not affect the differentially detected reproduced signal and a high C/N ratio signal is reproduced.

In the present embodiment, a portion of the light beam from the medium 5 is extracted by a third polarization beam splitter 31 and it is sensed by a photo-detector 32 so that servo signals, such as a tracking signal and focusing signal are detected in a known method. Such servo signals may be produced by using the photo-detectors $8_1$ and $8_2$, but, in the present embodiment, a servo signal photo-detector 32 is separately provided to prevent cross-talk of the servo signal and the reproduced signal.

In the present embodiment, a beam shaping prism 29 and a deflection prism 30 are formed integrally with the polarization beam splitter 3. The beam shaping prism 29 shapes the light beam emitted from the semiconductor laser 1 and having an elliptic cross-section into a circular cross-section beam. The deflection prism 30 deflects the light beam by an internal plane reflection. By deflecting the light beam by the deflection prism 30, the optical elements, excluding the objective lens 4, can be arranged in a plane substantially parallel to the medium 5, allowing the apparatus to be constructed more compactly.

The present invention is not limited to the illustrated embodiments, but may be modified in various ways. For example, while the reflected light from the medium is detected in the embodiments, the present invention may be applied to an apparatus which reproduces a signal from a transmitted light of an opto-magnetic recording medium by utilizing a Farady effect.

The present invention covers all such modifications, without departing from the scope of the claims.

What is claimed is:

1. A reproducing apparatus for reproducing information recorded on an opto-magnetic recording medium which includes a thin film having at least a magnetic recording layer formed on a transparent substrate, said apparatus comprising:
   irradiation means for irradiating the medium with a light beam polarized in a predetermined direction, the light beam being modulated by magneto-optic effect according to information recorded on the recording medium;

a half mirror for splitting the light beam into a transmitted light beam and a reflected light beam;

an optical element for directing the modulated light beam to said half mirror;

a plurality of analyzers having different transmission axis directions for transmitting the split light beam therethrough, one of said analyzers for transmitting the transmitted light beam therethrough and one of said analyzers for transmitting the reflected light beam therethrough;

a plurality of photodetectors for receiving the split light beam transmitted through said plurality of analyzers, one of said photodetectors receiving a respective transmitted light beam transmitted through a respective one of said analyzers and one of said photodetectors receiving a respective reflected light beam transmitted through a respective one of said analyzers; and a reproducing circuit for reproducing the information recorded on the recording medium by differentiating outputs of said plurality of photodetectors;

wherein an arrangement of said optical element and said half mirror satisfies the following conditions:

$$\delta_S + \delta_M + \delta_Q \approx n\pi$$

$$\delta_R \approx n_R \pi$$

$$\delta_T \approx n_T \pi$$

where $\delta_S$, $\delta_M$ and $\delta_Q$ are phase differences produced by the transparent substrate, the thin film and said optical element, respectively, between a polarized light component of the modulated light beam in the predetermined direction and a polarized light component of the modulated light beam in a direction orthogonal to the predetermined direction, $\delta_R$ is a phase difference produced by said half mirror between a polarized light component of the reflected light beam in the predetermined direction and a polarized light component of the reflected light beam in the direction orthogonal to the predetermined direction, $\delta_T$ is a phase difference produced by said half mirror between a polarized light component of the transmitted light beam in the predetermined direction and a polarized light component of the transmitted light beam in the direction orthogonal to the predetermined direction, and n, $n_R$ and $n_T$ are each integers.

2. A reproducing apparatus according to claim 1, wherein said irradiation means comprises a light source and an optical system for focusing light emitted from said light source into a spot on the recording medium.

3. A reproducing apparatus according to claim 1, wherein $n_R = 1$ and $n_T = 0$ for imparting a phase difference in the reflected light beam free of a phase difference in the transmitted light beam.

4. A reproducing apparatus according to claim 1, wherein $(-1/6 + n)\pi < \delta_M + \delta_S + \delta_Q < (1/6 + n)\pi$ is satisfied for permissible phase difference.

5. A reproducing apparatus according to claim 1, wherein said optical element comprises a polarization beam splitter for splitting the modulated light beam from the light beam irradiating the medium.

6. A reproducing apparatus according to claim 1, wherein said reproducing circuit includes a differential amplifier.

* * * * *

UNITED STATES PATENT AND TRADEMARK OFFICE
CERTIFICATE OF CORRECTION

PATENT NO. : 4,953,124
DATED : August 28, 1990
INVENTOR(S) : Osamu Koyama It is certified that error appears in the above-identified patent and that said Letters Patent is hereby corrected as shown below:

COLUMN 2

Line 36, "$I' \propto R^2 \Theta_K \sin 2\alpha \ldots$" should read --$I' \propto R^2 = \Theta_K \sin 2\alpha \ldots$--.

COLUMN 5

Line 15, "$\delta_{HM} \sim n\pi (n=0, \pm1, \pm2, \ldots) \ldots$" should read --$\delta_{HM} \sim n\pi \quad (n=0, \pm1, \pm2, \ldots) \ldots$--;
Line 19, "created" should read --created between--; and
Line 40, "$t_p^2$of" should read --$t_p^2$ of--.

COLUMN 6

Line 55, "Farady" should read --Faraday--.

Signed and Sealed this

Seventh Day of April, 1992

Attest:

HARRY F. MANBECK, JR.

Attesting Officer       Commissioner of Patents and Trademarks